(12) United States Patent
Wang et al.

(10) Patent No.: US 11,181,425 B2
(45) Date of Patent: Nov. 23, 2021

(54) METHOD FOR MAKING BLACKBODY RADIATION SOURCE

(71) Applicants: Tsinghua University, Beijing (CN); HON HAI PRECISION INDUSTRY CO., LTD., New Taipei (TW)

(72) Inventors: Guang Wang, Beijing (CN); Yang Wei, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/084,961

(22) Filed: Oct. 30, 2020

(65) Prior Publication Data

US 2021/0063245 A1 Mar. 4, 2021

Related U.S. Application Data

(62) Division of application No. 16/382,408, filed on Apr. 12, 2019, now Pat. No. 10,883,882.

(30) Foreign Application Priority Data

Nov. 1, 2018 (CN) .......................... 201811298948.4

(51) Int. Cl.
*G01J 5/52* (2006.01)
*B82Y 40/00* (2011.01)
*G01J 5/02* (2006.01)

(52) U.S. Cl.
CPC .............. *G01J 5/522* (2013.01); *B82Y 40/00* (2013.01); *G01J 5/023* (2013.01); *Y10S 977/858* (2013.01)

(58) Field of Classification Search
None
See application file for complete search history.

(56) References Cited

FOREIGN PATENT DOCUMENTS

| CN | 102737853 | 10/2012 |
| CN | 105675143 | 6/2016 |

OTHER PUBLICATIONS

Kohei Mizunoa et al., A black body absorber from vertically aligned single-walled carbon nanotubes, Department of Applied Physics, pp. 6044-6047, Apr. 14, 2009.

*Primary Examiner* — Barbara J Musser
(74) *Attorney, Agent, or Firm* — ScienBiziP, P.C.

(57) ABSTRACT

A method for making blackbody radiation source is provided. A blackbody radiation cavity and a carbon nanotube array located on a substrate are provided. A black lacquer layer is coated on an inner surface of the blackbody radiation cavity. A pressure is applied to the carbon nanotube array to form a carbon nanotube paper. The carbon nanotube paper is placed on the black lacquer layer. The substrate is peeled off to make the carbon nanotube paper bond to the black lacquer layer. An adhesive tape is placed on the carbon nanotube paper. And then the adhesive tape peeling off to separate carbon nanotubes in the carbon nanotube paper from the adhesive tape and bond to the black lacquer layer, the carbon nanotubes vertically aligned and forms the carbon nanotube array.

15 Claims, 5 Drawing Sheets

METHOD FOR MAKING BLACKBODY RADIATION SOURCE

CROSS-REFERENCE TO RELATED APPLICATIONS

This application is a division application of U.S. patent application Ser. No. 16/382,408, filed on Apr. 12, 2019, now U.S. Pat. No. 10,883,882, issued Jan. 5, 2021 entitled, "METHOD FOR MAKING BLACKBODY RADIATION SOURCE", which claims all benefits accruing under 35 U.S.C. § 119 from China Patent Application No. 201811298948.4, filed on Nov. 1, 2018, in the China National Intellectual Property Administration, the contents of which are hereby incorporated by reference. The disclosures of the above-identified applications are incorporated herein by reference.

FIELD

The present disclosure relates to a method for making blackbody radiation source.

BACKGROUND

With a rapid development of infrared remote sensing technology, the infrared remote sensing technology is widely used in military and civilian fields, such as earth exploration, weather forecasting, and environmental monitoring. However, all infrared detectors need to be calibrated by a blackbody before they can be used. The higher an emissivity of the blackbody, the higher an accuracy of a calibration of the infrared detector. Selecting high emissivity intracavity surface materials has a great significance for obtaining high performance blackbody radiation sources.

Carbon nanotubes are the blackest material in the world. An emissivity of carbon nanotubes is 99.6%, which is far greater than the emissivity of other black surface materials, for example, an emissivity of Nextel Velvet 81-21 black lacquer is only 96%. Therefore, the emissivity of the blackbody surface material including a carbon nanotube array is higher than the emissivity of other blackbody surface materials.

Conventional blackbody radiation source including the carbon nanotube array is prepared by directly growing the carbon nanotube array on the blackbody surface or directly transferring the carbon nanotube array to the blackbody surface. However, the method of directly growing the carbon nanotube array on the blackbody surface is complicated in operation and easy to introduce impurities. The method of directly transferring the carbon nanotube array to the blackbody surface tend to destroy the carbon nanotube array during the transfer process. For example, the carbon nanotubes of carbon nanotube arrays may be tilted, bent, or become entangled during the transfer process, resulting a surface of the carbon nanotube array being messy and the emissivity of blackbody radiation source being poor.

Therefore, there is a room for improvement.

BRIEF DESCRIPTION OF THE DRAWINGS

Implementations of the present technology will now be described, by way of example only, with reference to the attached figures, wherein.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

Figure 1:
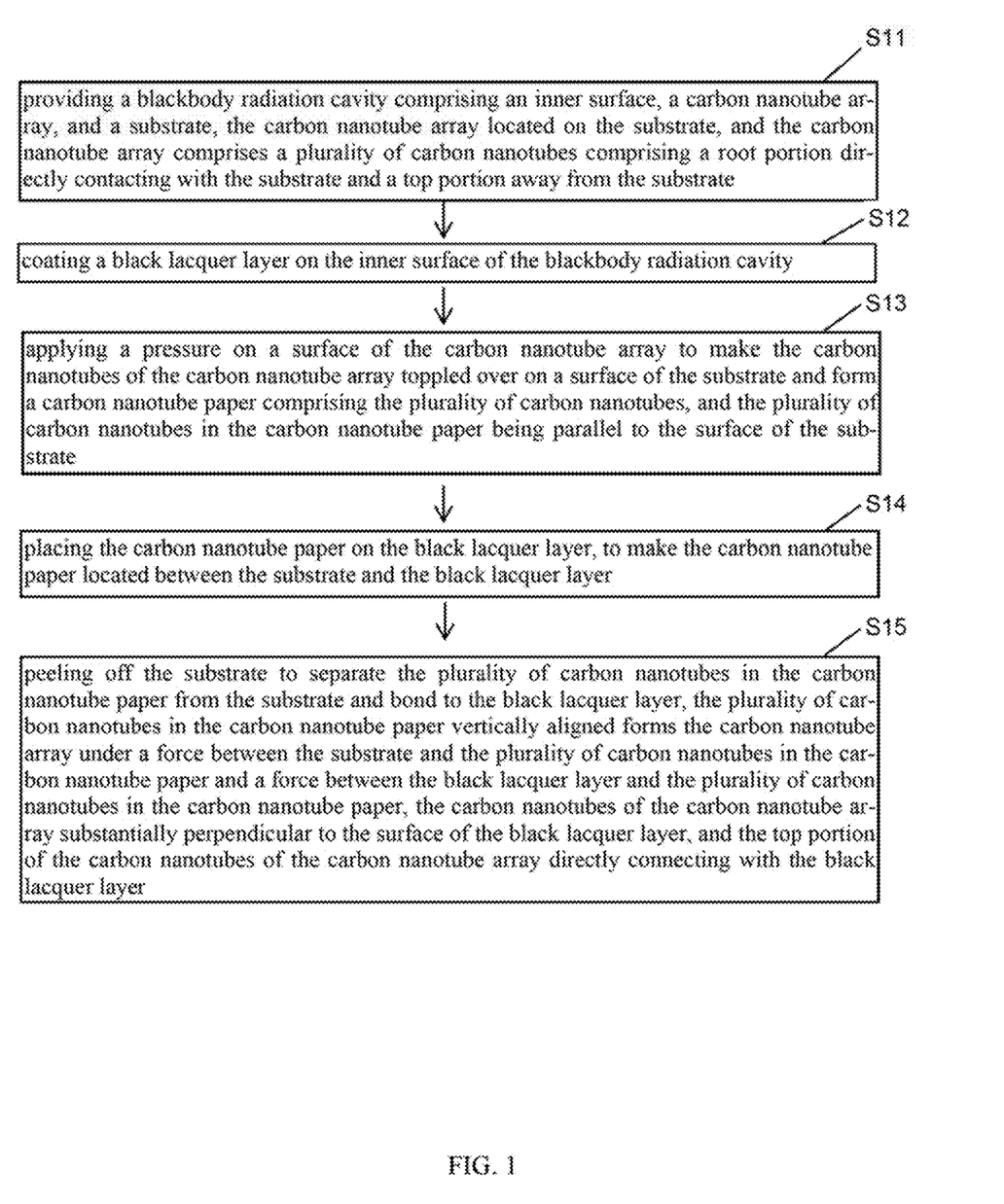
FIG. 1 is a flow diagram of one embodiment of a method for making blackbody radiation source.
Figure 2:
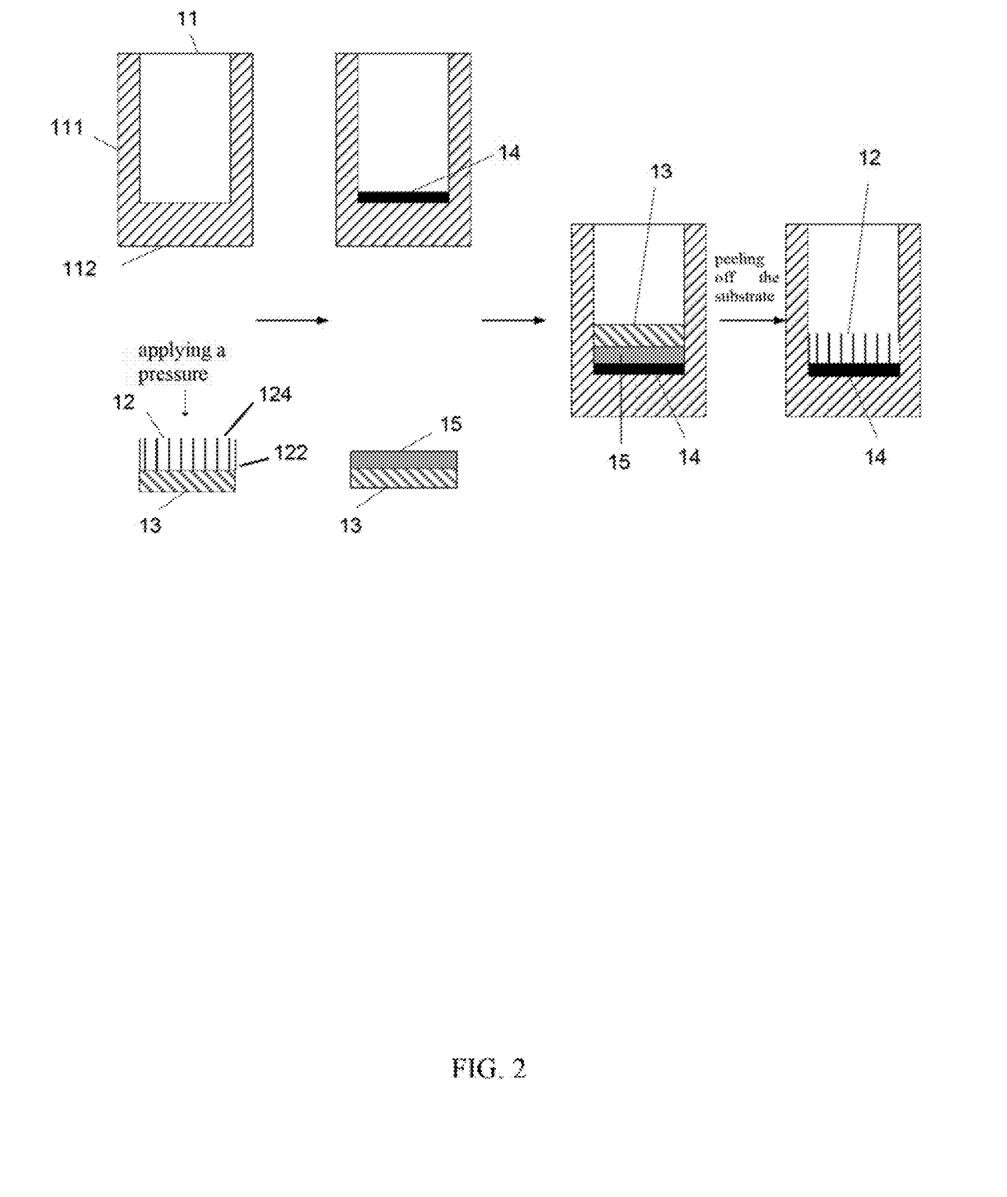
FIG. 2 is a process diagram of the method for making blackbody radiation source in FIG. 1.

FIG. 1 and FIG. 2 illustrate a method for making blackbody radiation source of one embodiment. The method for making blackbody radiation source comprises:

step (S11): providing a blackbody radiation cavity 11 comprising an inner surface, a carbon nanotube array 12, and a substrate 13, the carbon nanotube array 12 located on the substrate 13, and the carbon nanotube array 12 comprises a plurality of carbon nanotubes comprising a root portion 122 directly contacting with the substrate 13 and a top portion 124 away from the substrate 13;

step (S12): coating a black lacquer layer 14 on the inner surface of the blackbody radiation cavity 11;

step (S13): applying a pressure on a surface of the carbon nanotube array 12 to make the carbon nanotubes of the carbon nanotube array 12 toppled over on a surface of the substrate 13 and form a carbon nanotube paper 15 comprising the plurality of carbon nanotubes, and the plurality of carbon nanotubes in the carbon nanotube paper 15 being parallel to the surface of the substrate 13;

step (S14): placing the carbon nanotube paper 15 on the black lacquer layer 14, to make the carbon nanotube paper 15 located between the substrate 13 and the black lacquer layer 14; and step (S15): peeling off the substrate 13 to separate the plurality of carbon nanotubes in the carbon nanotube paper 15 from the substrate 13 and bond to the black lacquer layer 14, the plurality of carbon nanotubes in the carbon nanotube paper 15 vertically aligned forms the carbon nanotube array 12 under a force between the substrate 13 and the plurality of carbon nanotubes in the carbon nanotube paper 15 and a force between the black lacquer layer 14 and the plurality of carbon nanotubes in the carbon nanotube paper 15, the carbon nanotubes of the carbon nanotube array 12 substantially perpendicular to the surface of the black lacquer layer 14, and the top portion 124 of the carbon nanotubes of the carbon nanotube array 12 directly connecting with the black lacquer layer 14.

The blackbody radiation cavity 11 is made of a material resistant to high temperature and having a high emissivity. The blackbody radiation cavity 11 can be made of hard aluminum material, aluminum alloy material or oxygen-free copper.

The blackbody radiation cavity 11 comprises a blackbody cavity 111 and a blackbody cavity bottom 112. The blackbody cavity 111 and the blackbody cavity bottom 112 can be an integrally structure. The blackbody cavity 111 and the blackbody cavity bottom 112 can also be two independent structures, and the blackbody cavity bottom 112 can be pressed into or can be screwed into the blackbody cavity 111 from an end opening of the blackbody cavity 111.

The blackbody cavity 111 comprises a room. A cross section of the room can be circle, ellipse, triangle, quad, or other polygon. A shape of a bottom surface of the room is not limited. The shape of the bottom surface of the room can be a flat surface, a tapered surface, a prismatic surface, or other surfaces.

In one embodiment, the inner surface of the blackbody radiation cavity 11 is smooth. In one embodiment, a plurality of microstructures is formed on the inner surface of the blackbody radiation cavity 11. The plurality of microstructures can be a plurality of grooves spacing formed on the inner surface of the blackbody radiation cavity 11. The plurality of grooves can be annular grooves, strip grooves, point grooves or grooves extending axially along the blackbody radiation cavity 11.

In one embodiment, the blackbody cavity 111 and the blackbody cavity bottom 112 is an integrally structure, the blackbody cavity 111 comprises a cylindrical room, and the inner surface of the blackbody radiation cavity 11 is smooth.

In one embodiment, the carbon nanotube array 12 is a super-aligned carbon nanotube array. The carbon nanotubes of the super-aligned carbon nanotube array are substantially parallel to each other and perpendicular to a surface of the substrate 13. The carbon nanotubes of the super-aligned carbon nanotube array is joined with each other by Van der Waals forces to form an array. The carbon nanotubes of the super-aligned carbon nanotube array substantially perpendicular to the surface of the substrate 13, meaning that a large number of the carbon nanotubes of the super-aligned carbon nanotube array are perpendicular to the surface of the substrate 13, and a minority of carbon nanotubes of the super-aligned carbon nanotube array may be inclined. However, the number of inclined carbon nanotubes is very small and does not affect the overall oriented alignment of the majority of carbon nanotubes in the super-aligned carbon nanotube array. The inclined carbon nanotubes can be ignored. The super-aligned is free with impurities, such as amorphous carbon, residual catalyst metal particles or the like.

A method for making the super-aligned carbon nanotube array can be a chemical vapor deposition (CVD) method, an arc discharge preparation method, or an aerosol preparation method. In one embodiment, the super-aligned carbon nanotube array is directly grown on the substrate 13 by the chemical vapor deposition (CVD) method. The chemical vapor deposition (CVD) method comprises the steps of (a) forming a catalyst layer on a surface of the substrate 13, in which a material of the catalyst layer can be selected from the group consisting of iron (Fe), cobalt (Co), nickel (Ni) and alloy of any combination thereof. Step (b) is annealing the substrate with the catalyst layer in air at 700° C. to 900° C. for about 30 minutes to 90 minutes and (c) disposing the substrate 13 in a reaction chamber. The reaction chamber is heated in protective gas to 500° C.-740° C., and a carbon source gas is introduced into the reaction chamber for about 5 minutes to about 30 minutes. A height of the carbon nanotube of the super-aligned carbon nanotube array is ranged from about 200 micrometers to about 650 micrometers. The carbon source gas can be chemically active hydrocarbons, such as acetylene. The protective gas can be nitrogen, ammonia, or an inert gas. Examples of the method of making the super-aligned carbon nanotube array are taught by U.S. Pat. No. 7,045,108 to Jiang et al.

The black lacquer layer 14 has a viscosity. A bond force between the root portions 122 of the plurality of carbon nanotubes and the black lacquer layer 14 is less than a bond force between the top portions 124 of the plurality of carbon nanotubes and the black lacquer layer 14. The bond force between the top portions 124 of the carbon plurality of nanotubes and the black lacquer layer 14 is greater than a bond force between the root portions 122 of the plurality of carbon nanotubes and the substrate 13.

In one embodiment, the substrate 13 is a flat structure. A material of the substrate 13 can be flexible or rigid. For example, the material of the substrate 13 can be tape, metal, glass, plastic, silicon wafer, silicon dioxide sheet, quartz sheet, polymethyl methacrylate (PMMA), or polyethylene terephthalate (PET). In one embodiment, the substrate 13 is a silicon wafer.

The black lacquer 14 has high emissivity, such as Pyromark 1200 black lacquer having an emissivity 0.92, Nextel Velvet 811-21 black lacquer having an emissivity 0.95. In one embodiment, the black lacquer layer 14 is doped with a black material such as carbon nanotubes. A content of the carbon nanotubes in the black lacquer doped with carbon nanotubes is from about 1% to about 50%. In one embodiment, the material of the black lacquer layer 14 is the Nextel Velvet 811-21 black lacquer. A thickness of the black lacquer layer 14 can not be too small or too large. When the thickness of the black lacquer layer 14 is too small, such as less than 1 micrometer, a bind force between the carbon nanotube array 12 and the inner surface of the blackbody radiation cavity 11 is weak, and the carbon nanotube array 12 cannot be firmly fixed to the inner surface of the black body radiation cavity 11. On the contrary, when the thickness of the black lacquer layer 14 is too large, such as larger than 300 micrometers, the carbon nanotube array 12 is embedded in the black lacquer layer 14, therefore, a structure of the carbon nanotube array 12 is destroyed, and a high emissivity of the carbon nanotube array 12 cannot be exhibited. In one embodiment, the thickness of the black lacquer layer 14 ranges from about 1 micrometer to about 300 micrometers.

In step (S13), a surface of the carbon nanotube array 12 directly contacting with the substrate 13 is defined as a first surface, a surface of the carbon nanotube array 12 away from the first surface and opposite to the first surface is defined as a second surface. The first surface is formed by the root portions 122 of all the carbon nanotubes in the carbon nanotube array 12, and the second surface is formed by the top portions 124 of all the carbon nanotubes in the carbon nanotube array 12.

Applying the pressure on the second surface of the carbon nanotube array 30 by a pressure providing device. The pressure providing device can be a roller or a plate but not limited to them. When the pressure providing device is the roller, the roller can roll counterclockwise or clockwise on the second surface. When the pressure providing device is the plate, an angle between a direction of applying the pressure and the second surface is from 0 degree to about 90 degrees. In one embodiment, the angle between the direction of applying the pressure and the second surface is greater than or equal to 30 degrees and less than or equal to 60 degrees. The surface of the plate or roller directly contacting with the carbon nanotube array 12 is a flat surface and is not sticky. A material of the plate or roller is not limited. The material of the plate or roller can be metal such as steel and iron. The material of the plate or roller can also be non-metal such as glass, silicon plate, and diamond. In one embodiment, applying the pressure to the second surface of the carbon nanotube array 12 by a glass plate, and the angle between the direction of applying the pressure and the second surface is about 45 degrees.

If the pressure applied to the surface of the carbon nanotube array 12 is too large, the plurality of carbon nanotubes of the carbon nanotube array 12 are easily damaged; if the pressure applied to the surface of the carbon nanotube array 12 is too small, the carbon nanotube paper 15 can not be formed. In one embodiment, the pressure applied to the surface of the carbon nanotube array 12 is about 20 Newton.

Figure 3:
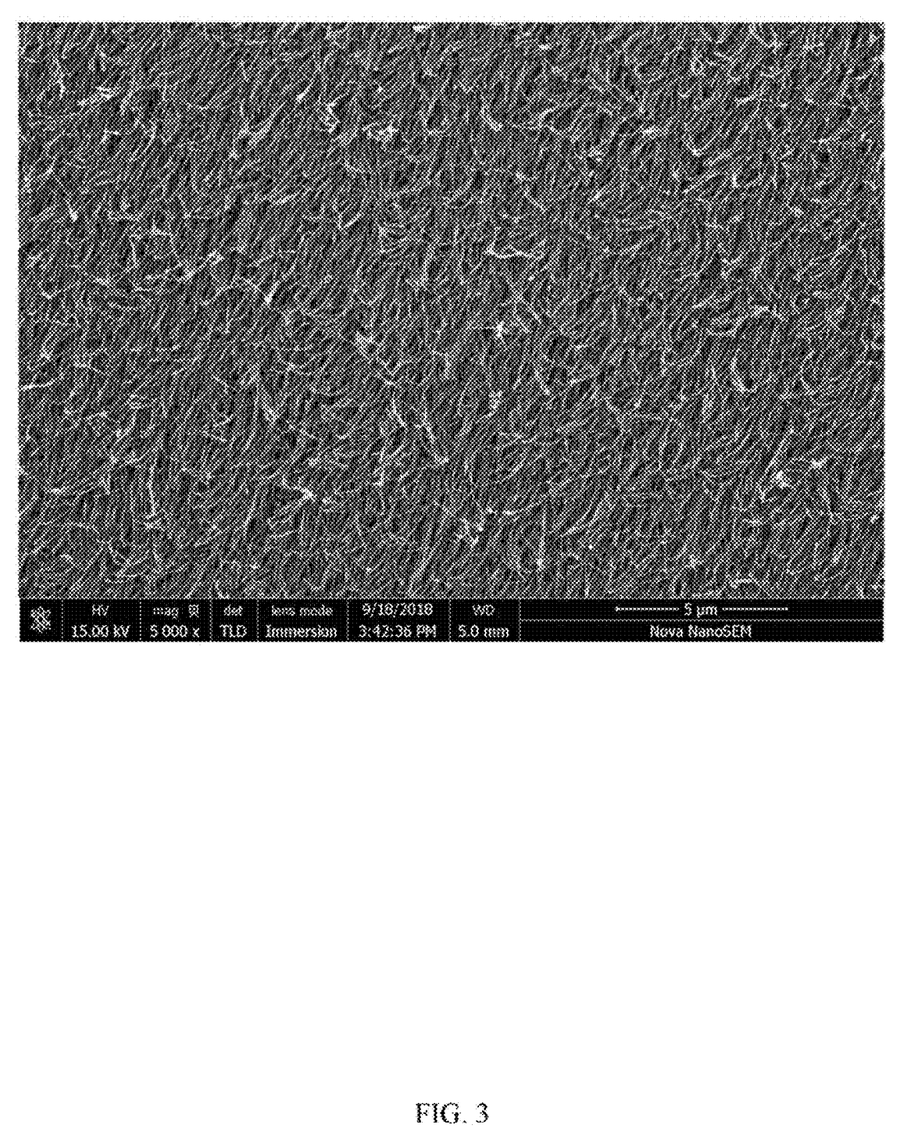
FIG. 3 is a scanning electron microscope (SEM) image of a carbon nanotube paper of one embodiment.

In one embodiment, the pressure providing device applies pressure to the carbon nanotube array 12 in one direction, and the plurality of carbon nanotubes of the carbon nanotube array 12 are toppled over in one direction, therefore, the plurality of carbon nanotubes in the carbon nanotube paper 15 are aligned in the same direction. It is advantageous to vertically bond the plurality of carbon nanotubes in the carbon nanotube paper 15 to the black lacquer layer 14 to form the carbon nanotube array 12 in a subsequent step. FIG. 3 shows a scanning electron microscope (SEM) image of one embodiment of the carbon nanotube paper 15.

In step (S14), after the carbon nanotube paper 15 is placed on the surface of the black lacquer layer 14, the substrate 13 can be further pressed to better bond the top portions 124 of the plurality of carbon nanotubes in the carbon nanotube paper 15 to the black lacquer layer 14.

In step (S15), the bind force between the root portions 122 of the plurality of carbon nanotubes in the carbon nanotube paper 15 and the black lacquer layer 14 is less than the bind force between the top portions 124 of the plurality of carbon nanotubes in the carbon nanotube paper 15 and the black lacquer layer 14. Therefore, during peeling off the substrate 13, the plurality of carbon nanotubes in the carbon nanotube paper 15 are first pulled up vertically, the top portions 124 of the plurality of carbon nanotubes is bonded to the black lacquer layer 14, and the root portions 122 of the plurality of carbon nanotubes is bonded to the substrate 13. The bind force between the top portions 124 of the plurality of carbon nanotubes and the black lacquer layer 14 is greater than the bind force between the root portions 122 of the plurality of carbon nanotubes and the substrate 13. Therefore, after the substrate 13 is completely peeled off, the plurality of carbon nanotubes in the carbon nanotube paper 15 are separated from the substrate 13 and vertically bonded to the surface of the black lacquer layer 14 and form the carbon nanotube array 12 on the surface of the black lacquer layer 14. The top portions 124 of the plurality of carbon nanotubes are directly in contact with the black lacquer layer 14. That is, after the carbon nanotube array 12 is transferred to the black lacquer layer 14, the carbon nanotube array 12 stands upside down on the surface of the black lacquer layer 14.

In one embodiment, during peeling off the substrate 13, a peeling direction of the substrate 13 is perpendicular to the surface of the substrate 13, and all the carbon nanotubes in the carbon nanotube paper 15 are simultaneously separated from the substrate 13.

The carbon nanotube array 12 can be bonded to a partial region or a whole region of the inner surface of the blackbody radiation cavity 11. In one embodiment, the carbon nanotube array 12 is bonded to the inner surface of the blackbody cavity bottom 112 by the black lacquer layer 14.

After the carbon nanotube array 12 is formed on the inner surface of the blackbody radiation cavity 11, the black lacquer layer 14 can be cured by natural drying. The black lacquer layer 14 is sticky; the carbon nanotube array 12 can be firmly fixed on the inner surface of the blackbody radiation cavity 11 and is not easy to fall off.

In one embodiment, an adhesive is disposed on the surface of the black lacquer layer to bond the carbon nanotube array 12 to the inner surface of the blackbody radiation cavity 11 more firmly. The adhesive can be a traditional adhesive. For example, the adhesive can be polyvinylidene fluoride (PVDF), polyvinylidene fluoride or polytetrafluoroethylene (PTFE).

The plurality of carbon nanotubes of the carbon nanotube array 12 is substantially perpendicular to the surface of the black lacquer layer 14, meaning that a large number of the carbon nanotubes of the carbon nanotube array 12 are perpendicular to the surface of the black lacquer layer 14, and a minority of carbon nanotubes of the carbon nanotube array 12 may be inclined. However, the number of inclined carbon nanotubes is very small and does not affect the overall oriented alignment of the majority of carbon nanotubes in the carbon nanotube array 12. The inclined carbon nanotubes can be ignored.

In one embodiment, the method for making blackbody radiation source further comprises annealing the carbon nanotube array 12 and the substrate 13 before step (S11) and after step (S12). Annealing the carbon nanotube array 12 can weaken the bind force between the plurality of carbon nanotubes in the carbon nanotube array 12 and the substrate 13; therefore, during peeling off the substrate 13, the carbon nanotube array is easily bonded to the black lacquer layer 14 and transferred to the black lacquer layer 14. In one embodiment, annealing the carbon nanotube array 12 and the substrate 13 in oxygen for about 9 minutes, a pressure of the oxygen is about 10 torr, and an annealing temperature is about 650° C.

In one embodiment, the method for making blackbody radiation source further comprises plasma treating the root portions 122 of the plurality of carbon nanotubes of the carbon nanotube array 12 after step (S15), to remove impurities on the surface of the carbon nanotube array 12.

In one embodiment, the method for making blackbody radiation source further comprises wrapping a heating element on an outer surface of the blackbody radiation cavity 11, and the blackbody radiation cavity 11 can be heated in real time. In one embodiment, the heating element comprises a carbon nanotube structure, a first electrode and a second electrode, the first electrode and the second electrode are spaced apart from each other on a surface of the carbon nanotube structure. The carbon nanotube structure is wrapped or wound around the outer surface of the blackbody radiation cavity 11. The carbon nanotube structure comprises at least one carbon nanotube film or at least one carbon nanotube wire. The carbon nanotube structure comprises a plurality of carbon nanotubes connected end to end and arranged in a preferred orientation. The plurality of carbon nanotubes of the carbon nanotube structure extends from the first electrode to the second electrode.

Because the carbon nanotube structure is wrapped or wound around the outer surface of the blackbody radiation cavity 11, after the carbon nanotube structure is energized by the first electrode and the second electrode, the carbon nanotube structure can heat the whole blackbody radiation cavity 11. So that a temperature field inside the blackbody radiation cavity 11 is evenly distributed, the temperature stability and uniformity of the cavity blackbody radiation source can be improved. Since carbon nanotube has small density and light weight, using the carbon nanotube structure as the heating element allows the cavity blackbody radiation source to have a lighter weight. Since carbon nanotubes have high electrothermal conversion efficiency and low thermal resistance, and the carbon nanotube structure has small resistance; using the carbon nanotube structure to heat the blackbody radiation cavity has the characteristics of rapid temperature rise, small thermal hysteresis and fast heat exchange rate. Carbon nanotubes have good toughness, and thus the cavity blackbody radiation sources using the carbon nanotube structure as heating element have a long service life.

When the substrate 13 is a growth substrate of the carbon nanotube array, the adhesive between the carbon nanotubes in the carbon nanotube paper 15 and the growth substrate is weak, and the adhesive between the plurality of carbon nanotubes in the carbon nanotube paper 15 and the substrate 13 is much smaller than the adhesive between the plurality of carbon nanotubes in the carbon nanotube paper 15 and the black lacquer layer 14. In step (S15), during peeling off the substrate 13, the adhesive is insufficient to bond one end of the carbon nanotubes in the carbon nanotube paper 15 to the substrate 13, and the carbon nanotube paper 15 will be entirely separated from the substrate 13 and transferred to the surface of the black lacquer layer 14. Therefore, when the substrate 13 is the growth substrate of the carbon nanotube array 12, the method for making blackbody radiation source further comprises step (S16), placing an adhesive tape on a surface of the carbon nanotube paper 15 away from the black lacquer layer 14, and then peeling off the adhesive tape. Peeling off the adhesive tape can make the plurality of carbon nanotubes in the carbon nanotube paper 15 pulled up vertically and vertically arranged on the surface of the black lacquer layer 14 under a force between the adhesive tape and the plurality of carbon nanotubes in the carbon nanotube paper 15 and a force between the black lacquer layer 14 and the plurality of carbon nanotubes in the carbon nanotube paper 15. The plurality of carbon nanotubes in the carbon nanotube array 12 is vertically arranged and substantially perpendicular to the surface of the black lacquer layer 14 and forms the carbon nanotube array 12. The bond force between the carbon nanotubes in the carbon nanotube array 12 and the adhesive tape is less than the bond force between the carbon nanotubes in the carbon nanotube array 12 and the black lacquer layer 14; therefore, the plurality of carbon nanotubes in the carbon nanotube paper 15 are not stuck by the adhesive tape.

Figure 4:
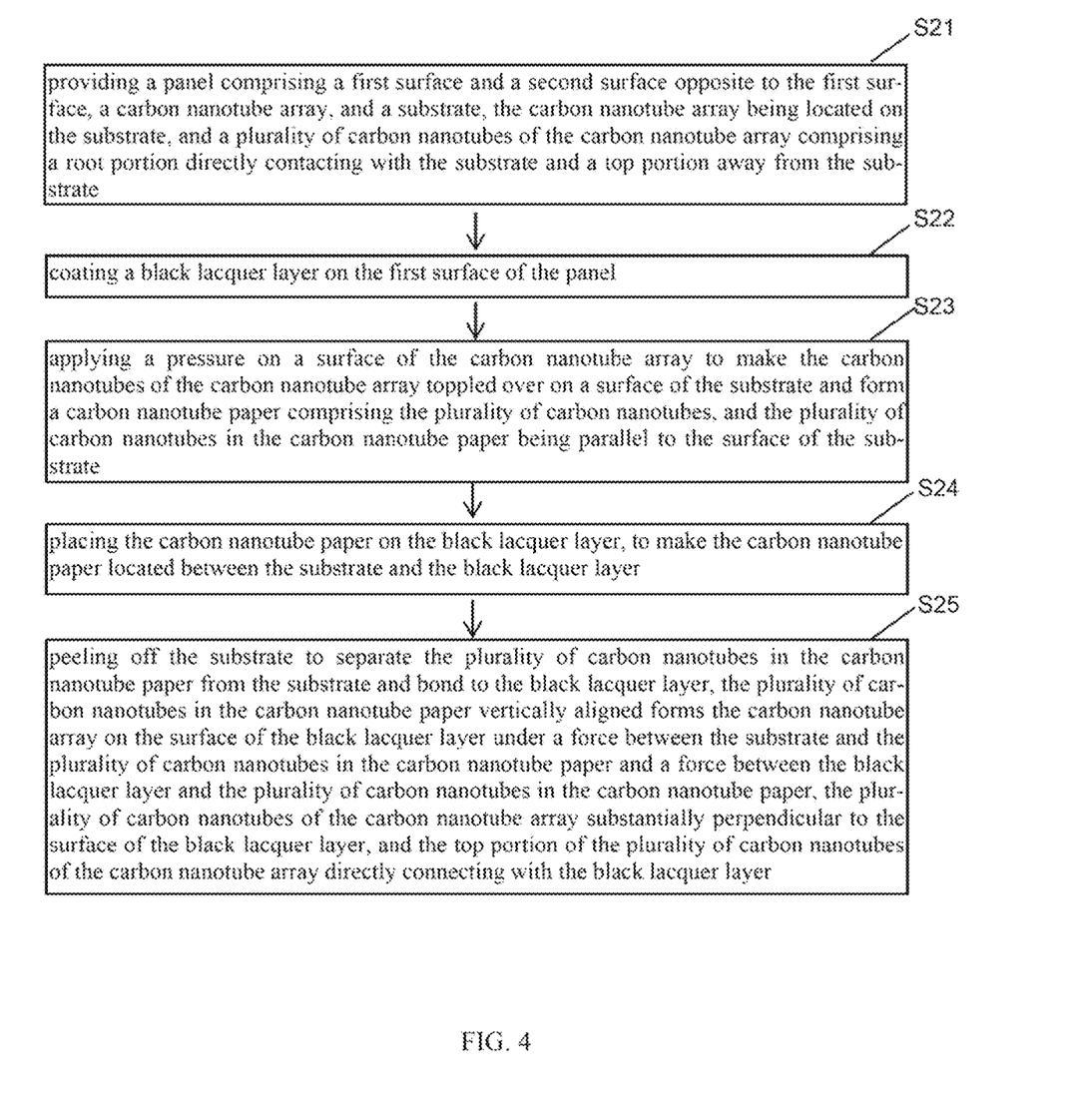
FIG. 4 is a flow diagram of one embodiment of a method for making blackbody radiation source.
Figure 5:
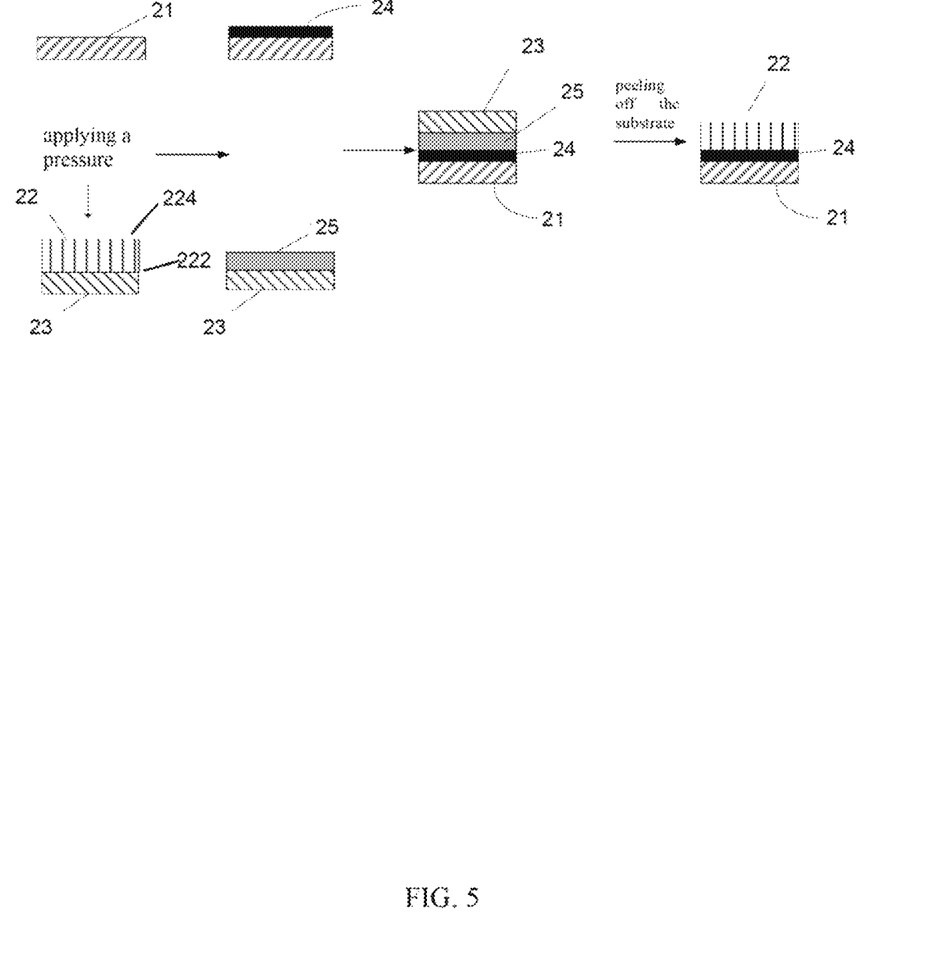
FIG. 5 is a process diagram of the method for making blackbody radiation source in FIG. 4.

FIG. 4 and FIG. 5 illustrate a method for making blackbody radiation source of one embodiment. The method for making blackbody radiation source comprises:

step (S21): providing a panel 21 comprising a first surface and a second surface opposite to the first surface, a carbon nanotube array 22, and a substrate 23, the carbon nanotube array 22 being located on the substrate 23, and a plurality of carbon nanotubes of the carbon nanotube array 22 comprising a root portion 222 directly contacting with the substrate 23 and a top portion 224 away from the substrate 23;

step (S22): coating a black lacquer layer 24 on the first surface of the panel 21;

step (S23): applying a pressure on a surface of the carbon nanotube array 22 to make the carbon nanotubes of the carbon nanotube array 22 toppled over on a surface of the substrate 23 and form a carbon nanotube paper 25 comprising the plurality of carbon nanotubes, and the plurality of carbon nanotubes in the carbon nanotube paper 25 being parallel to the surface of the substrate 23;

step (S24): placing the carbon nanotube paper 25 on the black lacquer layer 24, to make the carbon nanotube paper 25 located between the substrate 23 and the black lacquer layer 24; and step (S25): peeling off the substrate 23 to separate the plurality of carbon nanotubes in the carbon nanotube paper 25 from the substrate 23 and bond to the black lacquer layer 24, the plurality of carbon nanotubes in the carbon nanotube paper 25 vertically aligned forms the carbon nanotube array 22 on the surface of the black lacquer layer 24 under a force between the substrate 23 and the plurality of carbon nanotubes in the carbon nanotube paper 25 and a force between the black lacquer layer 24 and the plurality of carbon nanotubes in the carbon nanotube paper 25, the plurality of carbon nanotubes of the carbon nanotube array 22 substantially perpendicular to the surface of the black lacquer layer 24, and the top portion 224 of the plurality of carbon nanotubes of the carbon nanotube array 22 directly connecting with the black lacquer layer 24.

The panel 21 is made of a material resistant to high temperature and having a high emissivity. The panel 21 can be made of hard aluminum material, aluminum alloy material or oxygen-free copper.

The carbon nanotube array 22 is the same as the carbon nanotube array 12, the substrate 23 is the same as the substrate 13, and the black lacquer layer 24 is the same as the black lacquer layer 14. A method for forming the carbon nanotube paper 25 in step (S23) is the same as a method for forming the carbon nanotube paper 15 in step (S13). A method for peeling off the substrate 23 in step (S25) is the same as a method for peeling off the substrate 13 in step (S15).

In one embodiment, the method for making blackbody radiation source further comprises wrapping a heating element on the second surface of the panel 21, and the panel 21 can be heated in real time. The heating element in this embodiment is the same as the heating element wrapped on the outer surface of the blackbody radiation cavity 11.

In one embodiment, the method for making blackbody radiation source further comprises annealing the carbon nanotube array 32 and the substrate 23 before step (S22) and after step (S21). Annealing the carbon nanotube array 22 can weaken the bind force between the carbon nanotubes in the carbon nanotube array 22 and the substrate 23; therefore, during peeling off the substrate 23, the carbon nanotube array is easily bonded to the black lacquer layer 24 and transferred to the black lacquer layer 24.

In one embodiment, the method for making blackbody radiation source further comprises plasma treating the root portions 222 of the carbon nanotubes of the carbon nanotube array 22 after step (S25), to remove impurities on the surface of the carbon nanotube array 22.

When the substrate 23 is a growth substrate of the carbon nanotube array 22, the adhesive between the plurality of carbon nanotubes in the carbon nanotube paper 25 and the growth substrate is weak, and the adhesive between the plurality of carbon nanotubes in the carbon nanotube paper 25 and the substrate 23 is much smaller than the adhesive between the plurality of carbon nanotubes in the carbon nanotube paper 25 and the black lacquer layer 24. In step (S25), during peeling off the substrate 23, the adhesive is insufficient to bond one end of the carbon nanotubes in the carbon nanotube paper 25 to the substrate 23, and the carbon nanotube paper 25 will be entirely separated from the substrate 23 and transferred to the surface of the black lacquer layer 24. Therefore, when the substrate 23 is the growth substrate of the carbon nanotube array 22, the method for making blackbody radiation source further comprises placing an adhesive tape on the surface of the carbon nanotube paper 25, and then peeling off the adhesive tape after step (S25). Peeling off the adhesive tape can make the plurality of carbon nanotubes in the carbon nanotube paper 25 pulled up vertically and vertically arranged on the surface of the black lacquer layer 24 under a force between the adhesive tape and the plurality of carbon nanotubes in the carbon nanotube paper 25 and a force between the black lacquer layer 24 and the plurality of carbon nanotubes in the carbon nanotube paper 25, to form the carbon nanotube array 22 on the surface of the black lacquer layer 24. The plurality of carbon nanotubes in the carbon nanotube array 22 is vertically arranged and substantially perpendicular to the surface of the black lacquer layer 24. The bond force between the carbon nanotubes in the carbon nanotube array 22 and the adhesive tape is less than the bond force between the carbon nanotubes in the carbon nanotube array 22 and the black lacquer layer 24; therefore, the carbon nanotubes in the carbon nanotube paper 25 are not stuck by the adhesive tape.

The method for making blackbody radiation source has many advantages. First, the method first presses the carbon nanotube array into the carbon nanotube paper and then bonds it. Since the carbon nanotube paper has high mechanical strength and is not easily damaged, the carbon nanotubes will not tilted, bent, and entangled together during bonding the carbon nanotube array, thereby improving the emission efficiency of the surface source blackbody. Second, the plurality of carbon nanotubes in the carbon nanotube array are parallel to each other and perpendicular to the inner surface of the blackbody radiation cavity or the surface of the surface source blackbody substrate, a gap is formed between adjacent carbon nanotubes of the carbon nanotube array. When light is incident on the blackbody radiation cavity or the surface source blackbody, the light is reflected back and forth by adjacent carbon nanotubes in the gap, outgoing light will be greatly reduced, and thus the emissivity of the surface material is further improved. Third, since the carbon nanotube paper has high mechanical strength and is not easily damaged, pressing the carbon nanotube array into carbon nanotube paper before storing and transporting the blackbody radiation source, after reaching the transportation destination, the carbon nanotube paper is converted into a carbon nanotube array by the above method of the invention. Therefore, the damage to the carbon nanotube array during storage and transportation can be avoided. Fourth, the carbon nanotubes can be prepared by a chemical vapor deposition of carbon source gas under high temperature conditions, and the raw materials are cheap and easy to obtain. Fifth, the carbon nanotubes have excellent mechanical properties. The use of carbon nanotube array to prepare plane source blackbody can increase the stability of the plane source blackbody, and make the star borne blackbody not easy to damage in harsh environments. Sixth, the method for making blackbody radiation source is simple in operation and low in cost.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A method for making blackbody radiation source comprises:
   step (S11): providing a blackbody radiation cavity comprising an inner surface, a substrate, and a carbon nanotube array located on the substrate, wherein the carbon nanotube array comprises a plurality of carbon nanotubes comprising a root portion directly contacting with the substrate and a top portion away from the substrate;
   step (S12): coating a black lacquer layer on the inner surface of the blackbody radiation cavity;
   step (S13): applying a pressure on a surface of the carbon nanotube array to make the plurality of carbon nanotubes of the carbon nanotube array toppled over on a surface of the substrate and form a carbon nanotube paper comprising the plurality of carbon nanotubes, and the plurality of carbon nanotubes in the carbon nanotube paper being parallel to the surface of the substrate;
   step (S14): applying the carbon nanotube paper on the black lacquer layer, to make the carbon nanotube paper located between the substrate and the black lacquer layer;
   step (S15): peeling off the substrate to separate the carbon nanotube paper from the substrate and bond to the black lacquer layer; and
   step (S16): placing an adhesive tape on a surface of carbon nanotube paper away from the black lacquer layer; and peeling off the adhesive tape, to make the plurality of carbon nanotubes in the carbon nanotube paper vertically aligned form the carbon nanotube array under a force between the adhesive tape and the plurality of carbon nanotubes in the carbon nanotube paper and a force between the black lacquer layer and the plurality of carbon nanotubes in the carbon nanotube paper, the plurality of carbon nanotubes of the carbon nanotube array substantially perpendicular to the surface of the black lacquer layer, and the top portion of the plurality of carbon nanotubes of the carbon nanotube array directly connecting with the black lacquer layer.

2. The method of claim 1, wherein the carbon nanotube array is a super-aligned carbon nanotube array, and the plurality of carbon nanotubes of the super-aligned carbon nanotube array are substantially parallel to each other and perpendicular to a surface of the substrate.

3. The method of claim 1, wherein a bond force between the root portions of the plurality of carbon nanotubes and the black lacquer layer is less than a bond force between the top portions of the plurality of carbon nanotubes and the black lacquer layer; and the bond force between the top portions of the plurality of carbon nanotubes and the black lacquer layer is greater than a bond force between the root portions of the plurality of carbon nanotubes and the adhesive tape.

4. The method of claim 1, wherein an adhesive between the plurality of carbon nanotubes in the carbon nanotube paper and the substrate is smaller than an adhesive between the plurality of carbon nanotubes in the carbon nanotube paper and the black lacquer layer.

5. The method of claim 1, wherein a bond force between the plurality of carbon nanotubes in the carbon nanotube array and the adhesive tape is less than a bond force between the plurality of carbon nanotubes in the carbon nanotube array and the black lacquer layer.

6. The method of claim 1, wherein a thickness of the black lacquer layer ranges from about 1 micrometer to about 300 micrometers.

7. The method of claim 1, applying the pressure on the surface of the carbon nanotube array by a plate, wherein an angle between a direction of applying the pressure and the surface of the carbon nanotube array away ranges from about 30 degrees to about 60 degrees.

8. The method of claim 1, applying the pressure on the surface of the carbon nanotube array in one direction, wherein the plurality of carbon nanotubes of the carbon nanotube array are toppled over in one direction, the plurality of carbon nanotubes in the carbon nanotube paper are aligned in one direction.

9. The method of claim 1, wherein during peeling off the adhesive tap, a peeling direction of the adhesive tap is perpendicular to the surface of the adhesive tap, and all carbon nanotubes in the carbon nanotube paper are simultaneously separated from the adhesive tap.

10. The method of claim 1, wherein the blackbody radiation cavity comprises a blackbody cavity and a blackbody cavity bottom, and the carbon nanotube array is bonded to an inner surface of the blackbody cavity bottom by the black lacquer layer.

11. The method of claim 1, further comprising a step of annealing the carbon nanotube array and the substrate before the step (S12) and after the step (S11).

12. The method of claim 1, further comprising a step of plasma treating the root portions of the carbon nanotubes of the carbon nanotube array after the step (S16).

13. The method of claim 1, further comprising a step of wrapping a heating element on an outer surface of the blackbody radiation cavity, to make the blackbody radiation cavity been heated in real time.

14. The method of claim 13, wherein the heating element comprises a carbon nanotube structure, a first electrode and a second electrode, the first electrode and the second electrode are spaced apart from each other on a surface of the carbon nanotube structure.

15. The method of claim 1, wherein the carbon nanotube array is grown directly on the substrate.

* * * * *